United States Patent [19]

Thalmann

[11] Patent Number: 4,593,923

[45] Date of Patent: Jun. 10, 1986

[54] BICYCLE SPROCKET CHAIN CLEANER

[76] Inventor: Robert Thalmann, 4905 Paseo de Las Tortugas, Torrance, Calif. 90505

[21] Appl. No.: 729,926

[22] Filed: May 3, 1985

[51] Int. Cl.⁴ ............................................. B62M 9/00
[52] U.S. Cl. ................................... 280/261; 15/256.6; 184/15.1; 474/92
[58] Field of Search ................... 280/261, 293; 474/92, 474/91; 15/256.6; 184/15.1; 198/496

[56] References Cited

U.S. PATENT DOCUMENTS

| | | | |
|---|---|---|---|
| 635,778 | 10/1899 | Hudelson | 474/92 |
| 648,724 | 5/1900 | Cole | 474/92 |
| 3,931,991 | 1/1976 | Marchello | 280/295 |
| 4,280,591 | 7/1981 | Newcomb | 474/91 X |

Primary Examiner—John A. Pekar
Attorney, Agent, or Firm—Harlan P. Huebner

[57] ABSTRACT

This is a bicycle sprocket chain cleaner that includes a housing and a removable cover wherein the chain while still on the bicycle is placed in the housing and the cover is placed on the housing to enclose a portion of the chain. The chain may then be rotated in a counterclockwise manner wherein it passes through the cleaner and is cleaned of dirt and other foreign matter.

Within the housing there is a solvent reservoir and a plurality of brush members adapted to contact the chain and clean the same. Some of the brushes will wick the solvent to the chain to assist in cleaning the same.

In addition there is a solvent drain means associated with the housing to assure the chain is drained of solvent as it leaves the cleaner.

16 Claims, 6 Drawing Figures

BICYCLE SPROCKET CHAIN CLEANER

BACKGROUND OF THE INVENTION

1. Field of the Invention

This invention relates to a bicycle sprocket chain cleaner that can be placed around the chain to clean the same while it remains on the bicycle.

2. Description of the Prior Art

Bicycle sprocket chains or bicycle chains being exposed have a tendancy to collect dirt and foreign matter thereon as the bicycle is being ridden. As it is necessary to lubricate bicycle chains for proper operation the lubricant coating attracts the dirt in even greater amount.

A continual buildup of dirt and foreign matter on bicycle chain can interfer with the smooth operation of the bicycle. Thus it is important for proper maintainance of the bicycle to clean the chain periodically.

The most common method of previously cleaning a bicycle chain has been to remove it from the sprocket wheels, then soak the chain in solvent and wipe it off. After that the chain has to be replaced on the sprockets. This is a time consumming effort and can also result in a messy operation.

Another way to clean the chain is to allow the chain to remain on the bicycle and apply a solvent soaked rag to the chain. This presents problems in that it cannot be assured that all links of the chain will be properly cleaned, also the solvent will fall on the floor.

A newer type of chain cleaner that may be applied to the chain while it is on the bicycle is illustrated in U.S. Pat. No. 3,931,991. This patent is deficient in that it only utilizes two brushes to clean the top surface of the sprocket chain. In addition, this cumbersome device is held on the bicycle by hooks and the rear wheel must be elevated by placing it on a stand so the pedals and chain may rotate. Further, there is no provision to make sure that the links of the chain are drained of solvent when they emerge from the solvent bath.

SUMMARY OF THE INVENTION

It is a purpose of this invention to provide a bicycle sprocket chain cleaner which may be easily placed on the chain while the same is on a bicycle.

Another object of the invention is to provide a bicycle sprocket chain cleaner which has structure to clean the top, bottom, sides and inside the links of the chain.

A further object of the invention is to provide a bicycle sprocket chain cleaner that is lightweight and relatively small for easy installation.

A still further object of the invention is to provide a bicycle sprocket chain cleaner that includes sprocket hold down means to maintain the chain in proper position for cleaning.

Another object of the invention is to provide a bicycle sprocket chain cleaner that includes a reservoir of solvent to be applied to brushes therein that engage the links of the chain.

A further object of the invention is to provide a bicycle sprocket chain cleaner that include drainage means for solvent that remain on the bicycle chains as the links of the chain are about to exit the cleaner.

Another object of the invention is to provide a bicycle sprocket chain cleaner wherein the brushes used for cleaning are replaceable when they become worn.

A further object of the invention is to provide a bicycle sprocket chain cleaner wherein the chain does not pass through the reservoir but receives solvent from the brushed within the cleaner.

These and other objects and advantages will become apparent from the following part of the specification wherein details have been described to the competence of disclosure, without intending to limit the scope of the invention which is set forth in the appended claims.

BRIEF DESCRIPTION OF THE DRAWINGS

These advantages may be more clearly understood from the following detailed description and by reference to the drawings is which.

DETAILED DESCRIPTION OF THE PREFERRED EMBODIMENT

Figure 1:
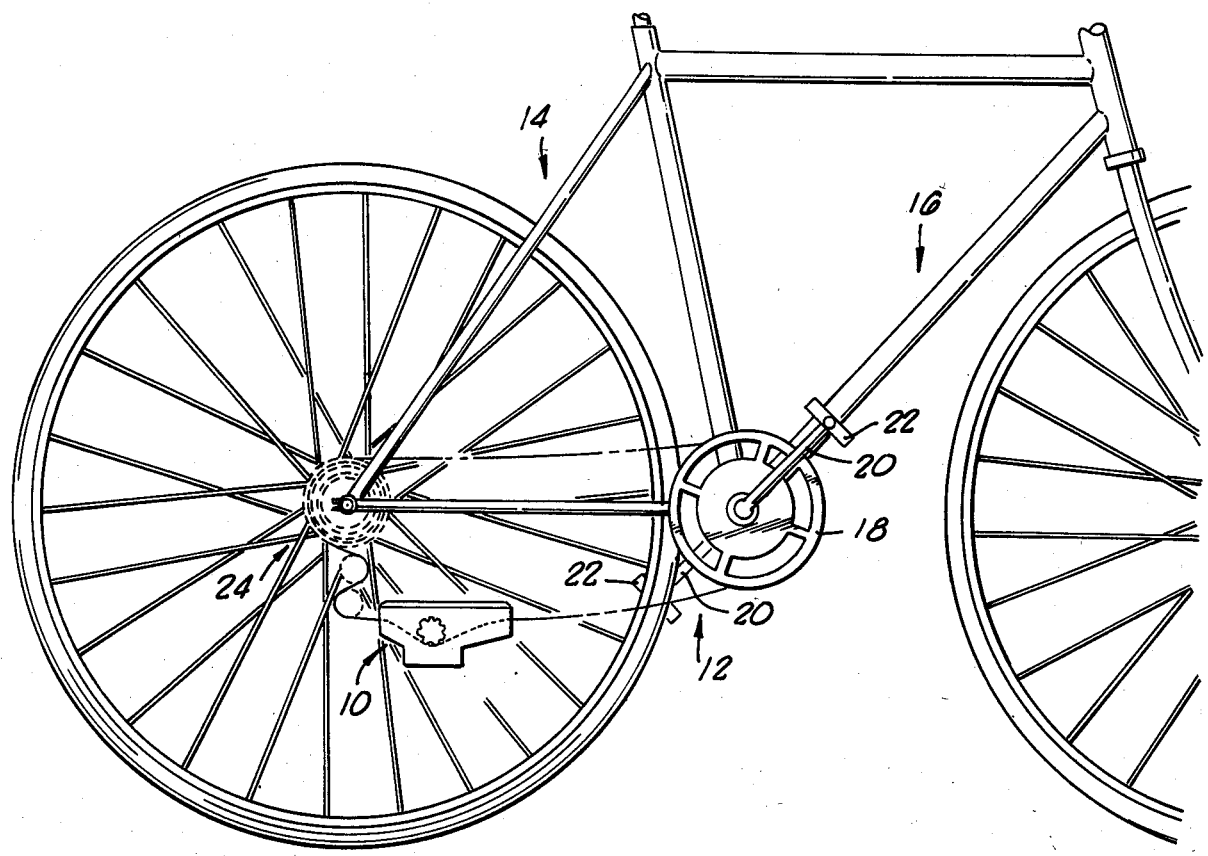
FIG. 1 is a side elevational environmental view of the bicycle sprocket chain cleaner of this invention mounted on the chain of a bicycle.

In FIG. 1 there is illustrated a bicycle sprocket chain cleaner generally designated 10 which is shown in position on a conventional bicycle sprocket chain 12 mounted on a conventional bicycle frame 16 including a pedal sprocket wheel 18 with a pair of pedal arms 20 secured thereto. A pair of pedals 22 are attached to the arms 20 to rotate the pedal arms 20.

The chain 12 passes around the sprocket wheel 18 to a rear sprocket mechanism 24 of a conventional multi-speed gear shifting arrangement.

Figure 2:
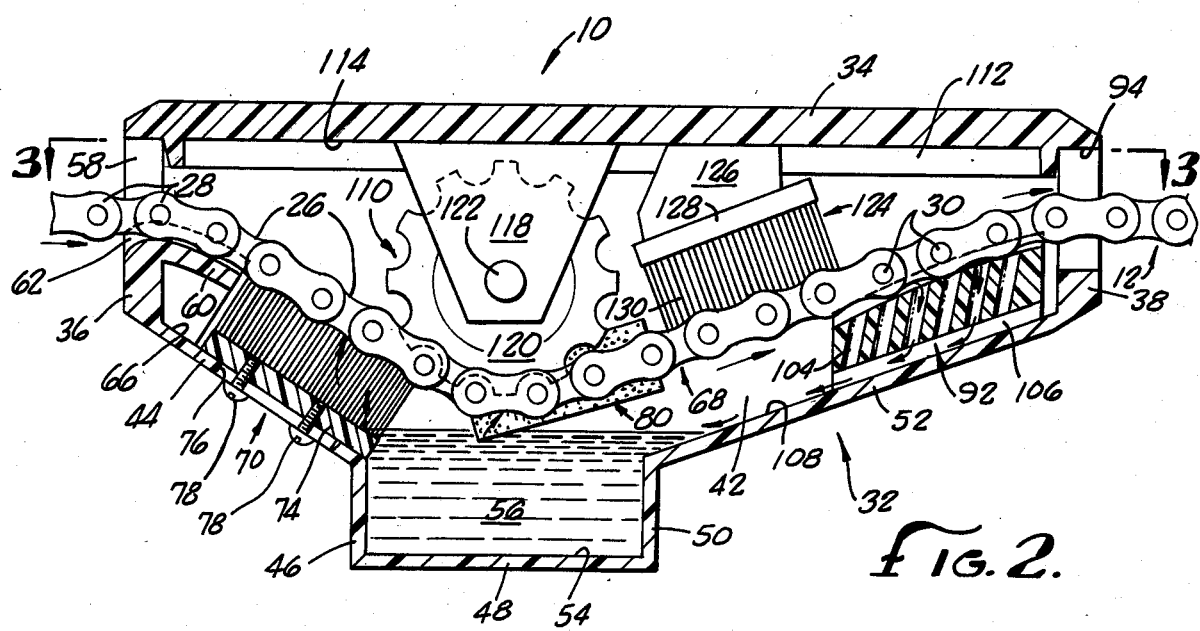
FIG. 2 is a cross-sectional elevational view of the present invention.

The sprocket chain 12 is of a conventional type made up of a plurality of inner links 26 and outer links 28 joined in articulated sequence by pivot pins 30 as best seen in FIG. 2. The links 26 and 28 are open in the center forming sprocket holes to be engaged by the sprocket wheels 18 and mechanism 24.

The bicycle sprocket chain cleaner 10, best seen in FIG. 2, includes a housing designated 32 having a cover 34 which is releasably secured to the housing 32 to close the same. Preferably the cleaner 10, housing 32 and cover 34 are made of plastic which may be clear or colored.

The housing 32 is generally elongated and includes a pair of entry and exit end walls 36 and 38 respectively interconnected by a pair of spaced apart side walls 40 and 42. The bottom of the housing 32 includes a sloped floor 44 extending from the end wall 36 downwardly to a vertical wall 46. There is a reservoir floor 48 extending horizontally from the vertical wall 46 to a vertical wall 50 which rises to another sloped floor 52 which inturn extends angularly upwardly to the end wall 38.

The side wall 40 and 42, side walls 46 and 50 and reservoir floor 48 form therebetween a solvent reservoir 54 wherein solvent 56 may be placed to assist in the cleaning of the links 26 and 28 of chain 12.

Figure 3:
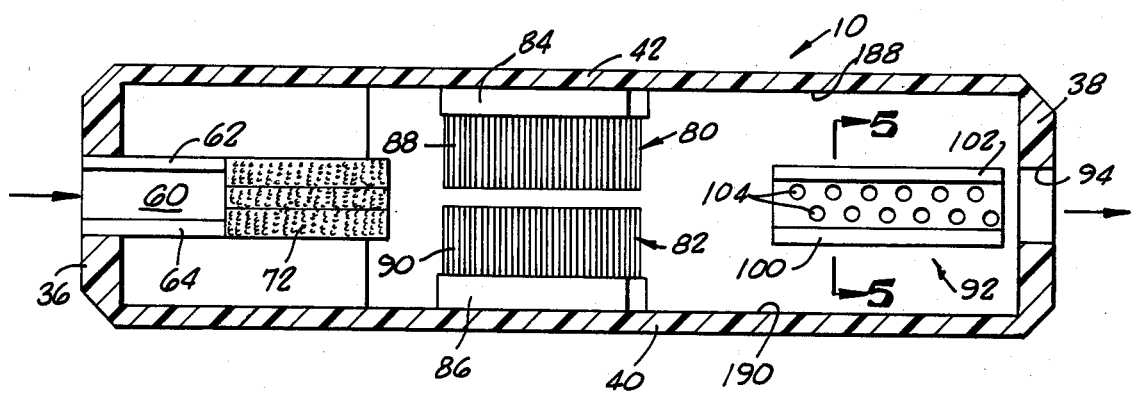
FIG. 3 is a cross-sectional view of the present invention taken on line 3—3 of FIG. 2.

The entry end wall 36 has an entry opening 58 to receive the chain 12. In addition, a chain guide 60 may be formed inwardly from the wall 36. The guide 60 includes a pair of edge guide rims 62 and 64, best seen in FIG. 3, defining a guide path just slightly wider than the width of the bicycle sprocket chain 12.

Resting upon the surface 66 of the sloped floor 44 is a portion of the chain engaging cleaning means 68 in the form of a brush 70. The brush 70 may be of the conventional type with bristles 72 mounted on a backing 74. In order to make the brush 70 adjustable up or down on the floor 44 there is an elongated slot 76 in the floor 44 and a pair of cap screws 78 which pass through the slot 76 into the backing 74. The brush 70 is aligned with the guide 60 and may be moved up and down so that a portion of the bristles 72 are submerged in the solvent 56 of the reservoir 54. The bristles 72 are of such a material to act as a wick and move the solvent upwardly in the bristles 72 to the chain as shown by the small arrows in FIG. 2.

Figure 6:
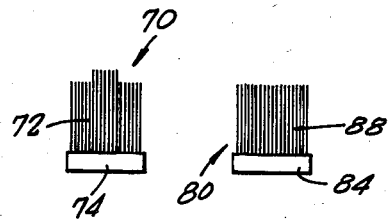
FIG. 6 is an end elevational view of the contour of the contacting surfaces of the respective brushes used in the present invention.

The preferred top contact contour of the bristles 72 is such that the central portion, along the length of the brush 70, as best seen in FIG. 6, is elevated above the rest of the bristles. In this way the bristles 72 can pass into the sprocket openings in the respective inner and outer links 26 and 28 of the chain 12.

Additional chain engaging cleaning means 68 are mounted approximate the mid section of the housing 32 and they are a pair of opposed spaced apart side brushes 80 and 82, each having backings 84 and 86 and bristles 88 and 90 similar to brush 70. In FIG. 6 there is illustrated a contour of the top of the bristles 88 of the brush 80. The top is flat as each brush is to clean the sides of the links of the chain 12.

The brushes 80 and 82 are mounted respectively to the inner surfaces 188 and 190 of the side walls 40 and 42. They are spaced from each other, see FIG. 3 slightly less than the width of the chain 12 to assure good contact with the sides of the links 26 and 28 of the chain 12.

Figure 5:
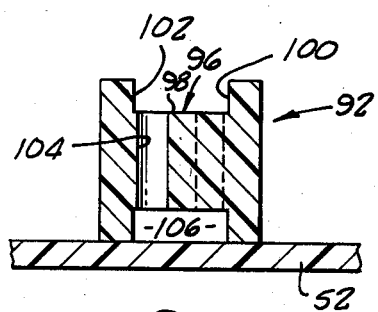
FIG. 5 is a cross-sectional view of the drainage means of the present invention taken on lines 5—5 of FIG. 3.

Mounted on the exit sloped floor 52 is solvent drainage means 92 which is aligned with an exit opening 94 in the exit end wall 38. The drainage means 92, as seen in FIGS. 2 and 5 includes a chain guide groove 96 formed by a bottom 98 and edge flanges 100 and 102.

Extending from the bottom 98 downward through the means 92 are a plurality of solvent drain holes 104 into a drain passage 106. As the chain 12 moves out the exit opening 94 over the groove 96 the excess solvent will flow through the holes 104 in the direction of the arrows in FIG. 2 into the drain passage 106 and by gravity down the inner surface 108 of sloped floor 52 back into the reservoir 54.

Figure 4:
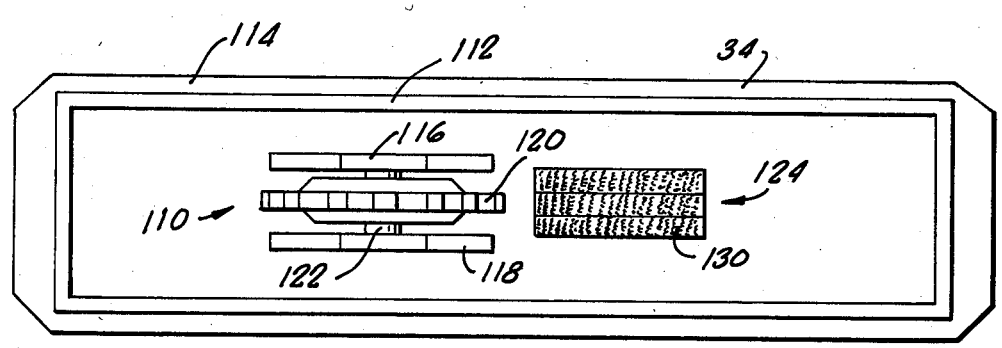
FIG. 4 is an underside view of the cover of the present invention.

The cover 34, as best seen in FIGS. 2 and 4, includes the additional chain engaging cleaning means 68 as well as chain engaging means 110.

The cover 34 may be releasably secured to the housing 32 by a snap flange 112 extending from the inner surface 114 of the cover 34. The snap flange 112 is positioned inwardly of the edges of the cover 34, see FIG. 4 and interfits snugly against the surfaces 188 and 190 of the side walls 40 and 42 and against the inside of the end walls 36 and 38. Friction will maintain the cover 34 in position on the housing.

The cover 34 can also employ a hook lock (not seen) or other exterior means to hold the cover 34 and housing 32 together without departing from the spirit of the invention.

The chain engaging means 110 mounted on the inner surface 114 includes a pair of spaced apart sprocket wheel mounting brackets 116 and 118. A sprocket wheel 120 is rotatably mounted between the brackets 116 and 118 on a axle 122.

Adjacent the chain engaging means 110 is an additional top brush means 124. The means 124 includes a brush bracket 126 suspended from the cover 34. Secured to the bracket 126 is a backing 128 with brush bristles 130 extending into the housing 32 when the cover is in place.

In top contour, see the left hand brush in FIG. 6, the brush bristles 130 have a mid portion that protrudes like the bristles 72 of the brush 70. In this way the bristles 72 can extend into the top portions of openings within the links 26 and 28 for effective cleaning.

In operation, the cover 34 is removed and solvent 56 is placed in the reservoir 54. Next the housing 32 is moved upwardly so a portion of the sprocket chain 12 is placed inside the housing 32 as best seen in FIG. 2. When the chain 12 is in place within the housing 32 overlying the brush 70 and solvent drainage means 92 as well as projecting out the entry opening 58 and exit opening 94, then the cover 34 may be positioned.

As the cover 34 is moved to a closed position, seen in FIG. 2, the sprocket wheel 120 and brush 124 will push the chain 12 down so that some of the links 26 and 28 will be positioned between the two side brushes 80 and 82 also some adjacent links engage the rear brush 72 and others the chain guide groove 96.

With the assembly and chain 12 in position, as shown in FIG. 2, the chain is ready for cleaning.

In order to move the chain 12 through the bicycle sprocket chain cleaner 10 one of the pedals 22 is turned counterclockwise. In this way the bottom portion on which the cleaner 10 is placed will move left to right in the direction of the arrows adjacent the chain 12 in FIG. 2.

Moving the chain 12 counterclockwise is a freewheeling manuever on bicycles with multiple gears. In this way the wheels of the bicycle 14 may remain on the ground. The pedal 22 will continue to be turned until the entire endless chain 12 has passed through the cleaner 10 and been completely cleaned of dirt and foreign matter. After the cleaning it is then necessary for complete bicycle maintenance to lubricate the chain 12 with an appropriate lubricant.

After the cover 34 is positioned, as the sprocket chain 12 moves through the cleaner 10 the operation commences with the respective links 26 and 28 in their articulated arrangement moving from left to right, FIG. 2, through the entry opening 58 of housing 32. The links along their bottom portions are pushed downward by the sprocket wheel 120 so that the raised middle portion of the bristles 72 extend into the link openings. In this way all of the bottom portions and the openings are engaged.

As the pedal 22 rotates the sprocket wheel 120 rotates moving the chain 12 through the cleaner 10. This movement causes the bristles 72 to vibrate or flex. This in turn will cause the bristles to act as a wick drawing solvent 56 upward as shown by the small arrows in FIG. 2. The solvent 56 will then be placed on the links and by the flexible scrubing motion the aforestated position of the chain links 26 and 28 are cleaned.

The links 26 and 28 then proceed beneath the sprocket wheel 120 and between the side brush members 80 and 82. In this way the respective outer sides of the links are cleaned. As can be seen a portion of the bristles of members 80 and 82 are positioned in the solvent to wick up solvent as seen in the small arrow. This action will additional solvent to the chain for cleaning.

The links 26 and 28 then continue upward at an angle under the top brush member 124. Here the cleaning of the tops of the links and link interiors is accomplished by the brush member 124. Again it has been found that solvent 56 will remain for this final cleaning.

The links then proceed angularly upward in the chain guide groove 96 and solvent 56 that remains on the chain 12 will fall through the solvent drain holes 104, see small arrows in FIG. 2, and drain down inner surface 108 of sloped floor 52 back into the reservoir 54 for reuse.

It is possible that if the cleaner 10 is allowed to remain free as illustrated in FIG. 1, the cleaner 10 will move with the chain 12 and no cleaning occurs. To correct this it is preferable to hold the cleaner 10 by hand at a fixed position. The cleaner 10 can be allowed to move to the pedal sprocket wheel 18 or some forward interference to stop the movement. However, it is possible such interference might restrict the counterclockwise rotational movement and defeat the intent of the cleaner 10.

Further, while the chain engaging means 110 preferable includes the sprocket wheel 120 with sprocket elements engaging the chain 12 between the link openings, it is not necessary to employ such a sprocket wheel. It has been found that the element 120 could be a wheel so as to reduce friction but is does not have to be a sprocket wheel. The wheel 120 could have a smooth circumference just so long as it depresses the links to engage the brushes while the cover 34 is in place.

The invention and its attendant advantages will be understood from the foregoing description and it will be apparent that various changes may be made in the form construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A bicycle sprocket chain cleaner for cleaning a bicycle sprocket chain while the chain is still mounted on a bicycle and said bicycle has a rear wheel and front wheel wherein the chain includes articulated pivoted links having bottom, top and opposed sides with sprocket openings therein to engage sprockets of a pedal sprocket wheel and gear wheels of said bicycle rear wheel and said chain being capable of moving through said cleaner without elevating said rear wheel during cleaning of said sprocket chain, said cleaner including:
a housing having opposed ends, opposed side walls and a bottom, said opposed ends including an entry opening and an exit opening respectively for said chain, and a portion of said chain is positioned in said housing with adjacent portions extending out through said respective entry and exit openings;
cleaning means mounted within said housing to engage different portions of the articulated links of said chain to clean the same as said links pass said cleaning means;
a cover adapted to fit on said housing and cover the same;
chain engaging means within said housing to maintain said articulated links of said chain in contact with said cleaning means.

2. A bicycle sprocket chain cleaner as defined in claim 1 wherein said housing includes:
cleaning solvent reservoir means associated with said cleaning means whereby solvent within said reservoir may be applied to said links to assist in cleaning the same.

3. A bicycle sprocket chain cleaner as defined in claim 2 wherein said housing includes:
solvent drainage means adjacent said exit opening in said housing and said chain is adapted to ride over said means allowing solvent thereon to drain therefrom and return to said cleaning solvent reservoir means.

4. A bicycle sprocket chain cleaner as defined in claim 3 wherein said solvent drainage means includes:
a block having a chain guide groove elevated above said bottom of said housing;
a plurality of solvent drain passages extending through said block from said chain guide groove and communicating with said bottom, and
said bottom being tapered downwardly from said exit opening to said reservoir to gravitationally allow solvent on said chain after cleaning to return to said reservoir for reuse.

5. A bicycle sprocket chain cleaner as defined in claim 1 wherein said cleaning means includes:
a bottom brush adjacent said entry opening and projecting upwardly to engage the bottom of said articulated links and clean the same as they are moved under said brush;
a pair of side brushes mounted on each of said side walls within said housing in spaces opposed relationship said brushes adapted to engage and clean the sides of said articulated links as they are moved under said brush; and
a top brush mounted to overlie and contact the top of said articulated links and clean the same as they are moved under said brush.

6. A bicycle sprocket chain cleaner as defined in claim 5 wherein:
a cleaning solvent reservoir is present in said housing and at least one of said brushes has a portion within said reservoir whereby solvent may be wicked up through said brush to said articulated links.

7. A bicycle sprocket chain cleaner as defined in claim 6 wherein at least three of said brushes have portions within said reservoir whereby solvent may be wicked up through said brushes to said articulated links.

8. A bicycle sprocket chain cleaner as defined in claim 5 wherein said top and bottom brushes include:
a mid section of bristles of a longer length then bristles on either side thereof wherein said raised mid section may penetrate said sprocket openings to assure adequate cleaning.

9. A bicycle sprocket chain cleaner as defined in claim 5 wherein said top brush is mounted on said cover adjacent said chain engaging means.

10. A bicycle sprocket chain cleaner as defined in claim 1 wherein said chain engaging means includes:
a rotatable roller mounted on said cover and extending into said housing to bear against a portion of said chain to maintain the same in contact with said cleaning means.

11. A bicycle sprocket chain cleaner as defined in claim 10 wherein said rotatable roller is a sprocket wheel having sprockets to engage said articulated links as they pass through said cleaner.

12. Apparatus for cleaning a bicycle chain while said chain is still mounted on said bicycle wherein said chain is formed of articulated links having bottoms, sides and tops with sprocket receiving openings extending vertically through said links, said openings adapted to receive sprockets of a pedal sprocket wheel and gear wheels of said bicycle and said bicycle gearing being of such a construction that counterclockwise pedal rotation will be free wheeling and allow said chain to rotate counterclockwise, said apparatus including:

a housing having a chain entry end and a chain exit end, a pair of opposed side walls extending between said ends and a bottom surface having a first portion adjacent said entry end sloping downwardly and a second portion adjacent said exit end sloping downwardly;

a solvent reservoir formed between said first and second portions of said bottom surface of said housing;

a bottom brush adjacent said entry end mounted on said first portion and projecting upwardly to engage the bottom of said articulated links, a pair of side brushes mounted on each of said side walls in spaced opposed relationship to engage the side of said articulated links;

a top brush mounted to overlie and contact the top of said articulated links;

said bottom and side brushes extending into said reservoir to drawup solvent to said articulated links for cleaning the same;

a cover to fit on said housing, said cover including chain engaging means to depress said articulated links thereunder and maintain a portion of the chain within said housing in contact with said brushes.

13. Apparatus as defined in claim 12 wherein said housing includes:

solvent drainage means mounted on said second portion adjacent said exit end and said articulated links ride over said means allowing solvent thereon to drain therefrom and return to said reservoir.

14. Apparatus as defined in claim 12 wherein said chain engaging means includes:

a sprocket wheel rotatably mounted on said cover, said sprocket wheel including sprockets to engage said articulated links as they pass through said apparatus.

15. A method of cleaning a bicycle chain while the chain remains on the bicycle around a pedal sprocket wheel and gearing means on the rear wheel of said bicycle, the pedal sprocket wheel including opposed foot pedals, said chain having an upper and lower generally horizontal reach, said method including the steps of:

removing the cover of a bicycle chain cleaner;

exposing the interior of an elongated housing of said cleaner, said housing having an entry opening and exit opening in respective ends thereof and having generally parallel side walls and a bottom;

placing a portion of said lower reach of said chain in said housing with an adjacent portion extending from both said entry and exit openings;

replacing said cover on said housing whereby apparatus thereon will depress said portion of said chain from the horizontal within said housing to engage the same with chain cleaning means mounted on said housing and said cover;

rotating said pedal sprocket wheel in a counterclockwise direction whereby said chain lower reach will move from left to right and said rear wheel will free wheel and not rotate; and moving said chain through said cleaner from said entry end to said exit end whereby all portions of said chain will be cleaned by said cleaning means.

16. A method as defined in claim 15 wherein the cleaner includes a solvent reservoir and there is an additional step of:

filling said reservoir with solvent; and assuring proper positioning of said chain cleaning means in said reservoir to wick solvent to said chain.

* * * * *